US009846605B2

(12) United States Patent
Gittelman et al.

(10) Patent No.: US 9,846,605 B2
(45) Date of Patent: Dec. 19, 2017

(54) SERVER-SIDE MINIMAL DOWNLOAD AND ERROR FAILOVER

(75) Inventors: Arye Gittelman, Mercer Island, WA (US); Petru Mihai Moldovanu, Redmond, WA (US); Sterling J. Crockett, Bothell, WA (US); Cindy Liao Hartwig, Sammamish, WA (US); Erin Megan Riley, Issaquah, WA (US); Xiaomei Wang, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1059 days.

(21) Appl. No.: 13/353,963

(22) Filed: Jan. 19, 2012

(65) Prior Publication Data

US 2013/0191492 A1 Jul. 25, 2013

(51) Int. Cl.
*G06F 15/16* (2006.01)
*G06F 11/07* (2006.01)
*H04L 29/08* (2006.01)
*G06F 17/30* (2006.01)

(52) U.S. Cl.
CPC ...... *G06F 11/0709* (2013.01); *G06F 11/0751* (2013.01); *G06F 17/30864* (2013.01); *H04L 67/02* (2013.01); *H04L 67/10* (2013.01)

(58) Field of Classification Search
CPC .... H04L 67/02; H04L 67/10; G06F 17/30864
USPC ....................................................... 709/207
See application file for complete search history.

(56) References Cited

U.S. PATENT DOCUMENTS

| 5,781,714 A | 7/1998 | Collins |
| 6,396,500 B1 | 5/2002 | Qureshi et al. |
| 6,691,176 B1 | 2/2004 | Narin |
| 6,865,599 B2 | 3/2005 | Zhang |

(Continued)

FOREIGN PATENT DOCUMENTS

| CN | 1682183 A | 10/2005 |
| CN | 1979485 A | 6/2007 |

(Continued)

OTHER PUBLICATIONS

K. Psounis, "Class-based delta-encoding: a scalable scheme for caching dynamic Web content," Proceedings 22nd International Conference on Distributed Computing Systems Workshops, 2002, pp. 799-805.*

(Continued)

*Primary Examiner* — Taylor Elfervig

(57) ABSTRACT

A server computing architecture is provided that uses minimal download features and includes error failover functionality. A server computer may receive an electronic page request and calculate a delta between a known static baseline electronic page and the requested electronic page. The static baseline electronic page may include an electronic page without content that utilizes a master electronic page. The master electronic page may include shared content for electronic pages associated with a website. The server computer may further determine whether one more errors are associated with rendering the calculated delta, render a payload comprising only the calculated delta upon determining an absence of the one or more errors and failover to one or more options upon determining that the one or more errors are associated with rendering the calculated delta.

20 Claims, 6 Drawing Sheets

(56) References Cited

U.S. PATENT DOCUMENTS

| | | | |
|---|---|---|---|
| 7,058,700 B1* | 6/2006 | Casalaina | G06F 17/30902 707/E17.12 |
| 7,185,063 B1 | 2/2007 | Kasriel | |
| 7,188,214 B1* | 3/2007 | Kasriel | G06F 17/30902 707/E17.12 |
| 7,275,244 B1 | 9/2007 | Bell et al. | |
| 7,296,051 B1 | 11/2007 | Kasriel | |
| 7,392,325 B2 | 6/2008 | Grove et al. | |
| 7,434,163 B2* | 10/2008 | McKellar | G06F 17/30902 707/E17.12 |
| 7,487,261 B1* | 2/2009 | Kasriel | G06F 17/30902 709/213 |
| 7,703,015 B2 | 4/2010 | McKellar et al. | |
| 7,765,274 B2 | 7/2010 | Kasriel et al. | |
| 7,831,556 B2 | 11/2010 | Behl et al. | |
| 7,904,432 B2 | 3/2011 | McKay et al. | |
| 8,271,333 B1* | 9/2012 | Grigsby | G06F 17/30017 705/14.4 |
| 8,700,691 B2 | 4/2014 | Gittelman et al. | |
| 2002/0140729 A1* | 10/2002 | Price | G06F 17/30893 715/749 |
| 2003/0135399 A1* | 7/2003 | Ahamparam | G06Q 10/06313 705/7.28 |
| 2003/0220944 A1 | 11/2003 | Lyman Schottland et al. | |
| 2004/0139169 A1 | 7/2004 | O'Brien | |
| 2006/0020631 A1 | 1/2006 | Cheong Wan et al. | |
| 2006/0031379 A1* | 2/2006 | Kasriel | H04L 67/2895 709/213 |
| 2006/0036938 A1* | 2/2006 | Quaranta | G06F 17/30861 715/205 |
| 2006/0212454 A1 | 9/2006 | Behl et al. | |
| 2007/0136415 A1 | 6/2007 | Behl et al. | |
| 2007/0300206 A1* | 12/2007 | Petrov | G06F 8/68 717/122 |
| 2008/0077653 A1 | 3/2008 | Morris | |
| 2008/0104256 A1* | 5/2008 | Olston | G06F 17/30899 709/228 |
| 2008/0134014 A1 | 6/2008 | Hind et al. | |
| 2008/0228773 A1 | 9/2008 | Stewart et al. | |
| 2009/0007241 A1 | 1/2009 | Tewari et al. | |
| 2009/0015599 A1 | 1/2009 | Bennett et al. | |
| 2009/0080523 A1 | 3/2009 | McDowell | |
| 2009/0100228 A1 | 4/2009 | Lepeska et al. | |
| 2009/0219829 A1 | 9/2009 | Merkey et al. | |
| 2009/0259552 A1 | 10/2009 | Chenard et al. | |
| 2009/0259934 A1 | 10/2009 | Prisament | |
| 2009/0271778 A1* | 10/2009 | Mandyam | G06Q 10/06 717/171 |
| 2009/0300709 A1* | 12/2009 | Chen | H04L 67/10 726/1 |
| 2009/0327510 A1 | 12/2009 | Edelman et al. | |
| 2011/0029641 A1 | 2/2011 | Fainberg et al. | |
| 2012/0016655 A1 | 1/2012 | Travieso | |
| 2012/0239731 A1 | 9/2012 | Shyamsunder | |
| 2012/0317493 A1 | 12/2012 | Vilke et al. | |
| 2013/0191435 A1 | 7/2013 | Gittelman et al. | |
| 2014/0164470 A1 | 6/2014 | Gittelman et al. | |

FOREIGN PATENT DOCUMENTS

| | | |
|---|---|---|
| CN | 101689194 A | 3/2010 |
| EP | 1388783 A1 | 2/2004 |
| JP | 2002-189618 | 7/2002 |
| JP | 2004-38439 | 2/2004 |

OTHER PUBLICATIONS

P. Ghosh and A. Rau-Chaplin, "Performance of Dynamic Web Page Generation for Database-driven Web Sites," International Conference on Next Generation Web Services Practices, Seoul, 2006, pp. 56-63.*

S. Sulaiman, S. M. Shamsuddin and A. Abraham, "Intelligent Web caching using Adaptive Regression Trees, Splines, Random Forests and Tree Net," 2011 3rd Conference on Data Mining and Optimization (DMO), Putrajaya, 2011, pp. 108-114.*

X. Qin and X. Zhou, "DB Facade: A Web Cache with Improved Data Freshness," 2009 Second International Symposium on Electronic Commerce and Security, Nanchang, 2009, pp. 483-487.*

Naaman, et al., "Evaluation of ESI and Class-Based Delta Encoding", In Proceedings of the 8th International Workshop on Web Caching and Content Distribution, 2003, 12 pages.

Savant, et al., "Server-Friendly Delta Compression for Efficient Web Access", In Proceedings of the Eighth International Workshop on {Web} Content Caching and Distribution, Sep. 2003, 12 pages.

"Updating Multiple Page Elements with Grails and Ajax", Published on: Jul. 20, 2009, Available at: http://weichhold.com/2009/07/20/updating-multiple-page-fragments-with-grails-and-ajax/, 5 pages.

Kubica, Marek, "Howto Use Python in the Web", Retrieved on: Nov. 17, 2011, Available at: http://docs.python.org/howto/webservers.html#howto-use-python-in-the-web, 12 pages.

Mitchell, Scott, "Serving Dynamic Content with HTTP Handlers", Published on: Apr. 2004, Available at: http://msdn.microsoft.com/en-us/library/ms972953.aspx, 22 pages.

Chinese Office Action dated Dec. 1, 2014 in Application No. 201210514067.8, 18 pgs.

International Search Report and Written Opinion dated Apr. 30, 2013 in Application No. PCT/US2013/021613, 9 pages.

International Search Report and Written Opinion dated Apr. 25, 2013 in Application No. PCT/US2013/021612, 10 pages.

Mesbah et al., "SPIAR: An architectural style for single page internet applications," Stichting Centrum voor Wiskunde en Informatica, Apr. 2006, ISSN 1386-369X, http://oai.cwi.nl/oai/asset/10866/10866D.pdf, 12 pages.

Henson, Val, "An Analysis of Compare-by-hash" In Proceedings of the 9th Conference on Hot Topics in Operating Systems, vol. 9, 2003, 6 pages.

International Search Report and Written Opinion for PCT/US2012/066490 dated Feb. 19, 2013.

Muthitacharoen, et al., "A Low-bandwidth Network File System", In Proceedings of the Eighteenth ACM Symposium on Operating Systems Principles, Dec. 2001, pp. 174-187.

U.S. Non-Final Office Action for U.S. Appl. No. 13/310,991 dated Mar. 15, 2013.

U.S. Appl. No. 13/310,991, filed Dec. 5, 2011 entitled Minimal Download and Simulated Page Navigation Features.

U.S. Appl. No. 13/354,164, filed Jan. 19, 2012 entitled Client-Side Minimal Download and Simulated Page Navigation Features.

Wahli, et al., "WebSphere Studio 5.1.2 JavaServer Faces and Service Data Objects", Published on: Jul. 2004, Available at: http://www.redbooks.ibm.com/redbooks/pdfs/sg246361.pdf.

Supplementary Search Report Received for European Patent Application No. 13738202.4, dated Jun. 18, 2015, 6 Pages.

Mesbah et al., "Exposing the Hidden-Web Induced by Ajax"; Delft University of Technology, Software Engineering Research Group, Technocal Report Series, Jan. 7, 2008; © Copyright 2008; 14 pgs.

EP Communication dated Dec. 7, 2015 in Application No. PCT/US2013/021612, 10 pgs.

U.S. Office Action for U.S. Appl. No. 14/182,153 dated Sep. 11, 2015, 45 pgs.

Lengstorf, "Pro PHP and jQuery", Jun. 22, 2010, Apress, 4 pgs.

U.S. Office Action for U.S. Appl. No. 13/354,164 dated Oct. 15, 2015, 47 pgs.

Chinese Second Office Action dated Jul. 31, 2015 in Application No. 201210514067.8, 6 pgs.

U.S. Appl. No. 14/182,153, Office Action dated Oct. 6, 2016, 25 pgs.

Chinese Notice of Allowance in Application No. 201380006024.1, dated Sep. 7, 2016, 7 pgs.

Chinese Notice on Grant dated Jan. 13, 2016 in Appln. No. 201210514067.8, 4 pgs.

Chinese Office Action and Search Report Issued in Chinese Patent Application No. 201380006024.1, dated Dec. 28, 2015, 11 Pages.

European Official Communication in Application 13738059.8, dated Jan. 4, 2016, 1 page.

(56) References Cited

OTHER PUBLICATIONS

European Official Communication in Application 13738202.4, dated Jul. 7, 2015, 1 page.
U.S. Office Action for U.S. Appl. No. 14/182,153 dated Mar. 15, 2016, 36 pgs.
U.S. Appl. No. 13/310,991 Notice of Allowance dated Nov. 15, 2013, 17 pgs.
U.S. Appl. No. 13/310,991 Notice of Allowance dated Jan. 13, 2014, 15 pgs.
Chinese 1st Office Action in Application 201380006055.7, dated Jul. 15, 2016, 12 pgs.
Lengstorf, Jason, "Pro PHP and jQuery", published 2010, Apress, pp. 22, 73 and 79, 8 pages total.
U.S. Appl. No. 13/354,164, Office Action dated Apr. 28, 2016, 29 pgs.
Chinese 2nd Office Action mailed in Application 201380006055.7, dated Mar. 14, 2017, 13 Pages.
Japanese Office Action dated in Application 2014-553349, dated Feb. 14, 2017, 8 Pages.
Shono, Atsushi et al., "Efficient Dynamic Web Contents Delivery Method Utilizing Fingerprint Cache", in the Journal, Information Processing Society of Japan (IPSJ), vol. 46, No. 2, Feb. 15, 2005, pp. 570-584. (with English abstract).
U.S. Appl. No. 14/182,153, Office Action dated May 5, 2017, 27 pgs.
U.S. Appl. No. 13/354,164, Amendment and Response filed Jul. 7, 2017, 30 pgs.
U.S. Appl. No. 14/182,153, Advisory Action dated Sep. 18, 2017, 5 pgs.
Chinese 3rd Office Action in Application 201380006055.7, dated Sep. 19, 2017, 18 pages.

\* cited by examiner

SERVER-SIDE MINIMAL DOWNLOAD AND ERROR FAILOVER

CROSS-REFERENCE TO RELATED APPLICATIONS

This application is related to U.S. patent application Ser. No. 13/310,991, filed on Dec. 5, 2011, and entitled "Minimal Download and Simulated Page Navigation Features." This application is also related to U.S. patent application Ser. No. 13/354,164, filed on Jan. 19, 2017, and entitled "Client-Side Minimal Download and Simulated Page Navigation Features." The disclosure of both of the aforementioned applications is hereby incorporated herein, in their entirety, by reference.

BACKGROUND

The computing age has dramatically affected the consumer knowledge base which, in turn, requires device and application providers to provide user-friendly and rich application functionality. Collaboration or content management systems provide a natural place to share ideas and information due in part to access and management abilities offered to multiple users, rich customization options, and a lightweight collaborative environment. However, a general problem pertains to reducing the amount of data sent to a web page during a navigation operation. One solution uses data compression and non-navigation operations, requiring a client to request specific data changes. Unfortunately, disadvantages of such a technique include: a) a complete rewrite of a web page, b) each individual part of a page may update separately, which can be very expensive and inefficient, and c) page changes are not recorded in a browser history such that the back and forward buttons or other navigation features do not operate as expected.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

A server computing architecture is provided that uses minimal download features and includes error failover functionality. A server computer may receive an electronic page request and calculate a delta between a known static baseline electronic page and the requested electronic page. The static baseline electronic page may include an electronic page without content that utilizes a master electronic page. The master electronic page may include shared content for electronic pages associated with a website. The server computer may further determine whether one more errors are associated with rendering the calculated delta, render a payload comprising only the calculated delta upon determining an absence of the one or more errors and failover to one or more options upon determining that the one or more errors are associated with rendering the calculated delta.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

A server computing architecture is provided that uses minimal download features and includes error failover functionality. A server computer may receive an electronic page request and calculate a delta between a known static baseline electronic page and the requested electronic page. The static baseline electronic page may include an electronic page without content that utilizes a master electronic page. The master electronic page may include shared content for electronic pages associated with a website. The server computer may further determine whether one more errors are associated with rendering the calculated delta, render a payload comprising only the calculated delta upon determining an absence of the one or more errors and failover to one or more options upon determining that the one or more errors are associated with rendering the calculated delta.

Figure 1:
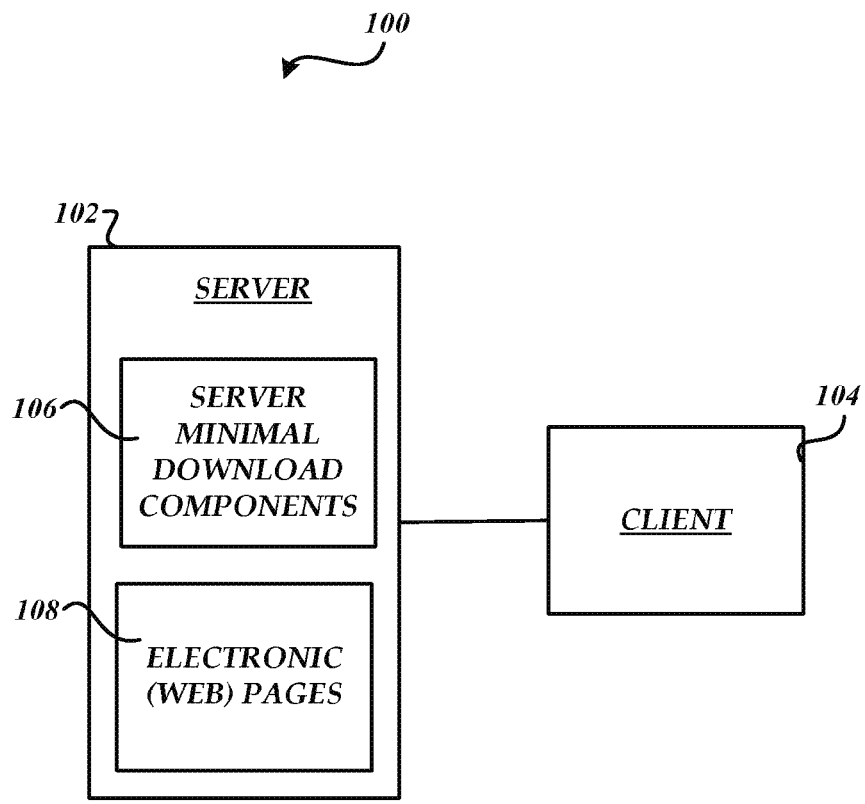
FIG. 1 is a block diagram of an exemplary computing environment, in accordance with an embodiment.

FIG. 1 is a block diagram of an exemplary computing environment 100, in accordance with an embodiment. The computing environment 100 may include processing, memory, networking, and/or other components that provide electronic page navigation features and functionality, including server minimal download and error failover for requested electronic pages. As shown in FIG. 1, the exemplary computing environment 100 includes at least one server system or server 102 and at least one client 104 that are used as part of implementing a page navigation mechanism or process, but is not so limited. Those skilled in the art will recognize that a plurality of client devices/systems can be configured to communicate and/or interact with a number of servers and/or other components using available wireless and/or wired infrastructure and functionalities. For example, a user can use the client 104 as part of interacting with a computing device or system to access and use information and resources of a plurality of collaboration, web, file, and/or other servers as part of browsing electronic or web pages. It will be appreciated that during a typical interactive session, a user can use the client 104 to call on and access server information and/or services from a plurality of physical serving machines (e.g., web server, collaboration server, database server, etc.).

As described below, a server minimal download technique determines a delta (i.e., differences) between a requested electronic page and a static baseline electronic page prior to sending the requested electronic page to a client. It should be appreciated that the aforementioned technique takes advantage of the fact that most pages in a web site share the majority of their common user interface ("UI"), script files and style sheets. In accordance with one implementation or embodiment, a main template file called a master page and content pages that use the master page may be utilized. The static baseline page is produced by creating a content page with no content. Thus, the static baseline page represents a snapshot of the aforementioned common features. It should further be appreciated that various error cases might cause the aforementioned server minimal download technique to fail. In accordance with an embodiment, various error cases are evaluated and a message may be sent to the client in lieu of the delta contents as part of a failover process.

In one embodiment, the server minimal download components 106 may be utilized as part of a minimal download strategy during a page navigation operation when the server 102 determines that a minimal download page transition process is to be used. The server 102 can process an electronic page request (e.g., from among the electronic pages 108) and determine whether to direct the client 104 to a failover process and normal page navigation procedures, or calculate a delta between a known static baseline electronic page and the requested electronic page.

It will be appreciated that other user devices/systems can be included that couple, communicate, and/or interact with one or more components of the environment 100 as part of providing page navigation features and functionality. Each server can include one or multiple physical serving machines, including co-location, remote-location, and/or distributed architectures. End-users can use different interactive applications, including browser-type applications such as those used with smartphones, laptop computers, tablet computers, desktop computers, and/or other computer/communication interfaces, to access features of the environment 100. For example, an enterprise user can use a browser or other application to create and/or access a SHAREPOINT worksite using a browser-type interface. In an embodiment, a user can use a browser application or interface to leverage the features and functionality of the exemplary computing environment 100, including existing and/or future standards, cross-browser compatible markup, etc.

Figure 2:
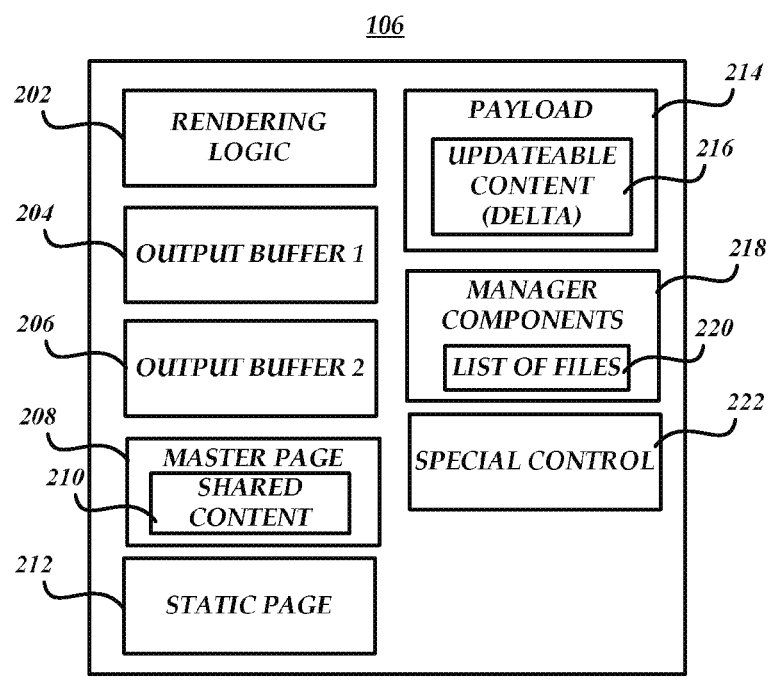
FIG. 2 is a block diagram illustrating exemplary server minimal download components, in accordance with an embodiment.

FIG. 2 is a block diagram illustrating exemplary server minimal download components 106, in accordance with an embodiment. The server minimal download components 106 may include rendering logic 202, a first output buffer 204, a second output buffer 206, a master page 208, a static page 212, a payload 214, one or more manager components 218 and a special control 222.

In accordance with an embodiment, the server 102 may execute the rendering logic 202 to render an electronic page delta in response to a request from a client computing device. The rendering logic 202 may comprise a Render method which is called via an iteration of a control tree (i.e., hierarchically arranged controls on an electronic page) in an application framework such as the ASP.NET Web application framework from MICROSOFT CORPORATION of Redmond, Wash. When producing an electronic page delta, the server 102 executes the rendering logic 202 in the first output buffer 204 which is never used. The payload 214 may comprise updateable content 216 which may include controls (e.g., page content, page description, etc.) that are wrapped in the special control 222 that is aware of the rendering logic 202. The special control 222 may utilize the second output buffer 206 to pass the wrapped controls to children in the control tree. The end result is that the first output buffer 204 contains markup (e.g., HTML) that should not be sent to the client and the second output buffer 206 contains only the parts (i.e., the delta) that should be sent to the client. The first output buffer 204 is then discarded and the second output buffer 206 is utilized by the server 102 to produce the payload 214 that is sent to the client for rendering. It should be understood by those skilled in art, that electronic pages may contain more than just markup. In particular, most electronic pages in a complex web application contain references to script and stylesheet files. The manager components 218 may be utilized to register for the aforementioned electronic pages and file types during server processing. Then, during a delta render, the manger components 218 output a list of files 220 which is sent to the client for processing. The payload 214 may further comprise a proprietary block of data that contains all the content sections that must be updated (i.e., the updateable content 216) as well as various metadata (not shown). It should be understood that the information in the payload 214 may be parsed by the client and used to update all the updateable sections on the requested electronic page in a browser.

As briefly discussed above with respect to FIG. 1, the master page 208 may comprise a main template file that uses electronic content pages. The master page 208 may include shared content 210 which may include, without limitation, common UI, script files and stylesheets shared by electronic pages in a web site. The static page 212 may comprise a baseline page that is produced by creating a content page with no content.

Figure 3:
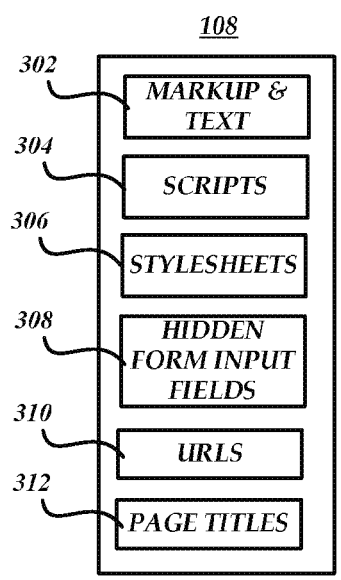
FIG. 3 is a block diagram illustrating an exemplary electronic page, in accordance with an embodiment.

FIG. 3 is a block diagram illustrating an exemplary electronic page 108, in accordance with an embodiment. The electronic page 108 may include, without limitation, markup and text 302, scripts 304 (including references to external script files and inline blocks of script), stylesheets 306 (including references to external stylesheets and inline style blocks), hidden form input fields 308, uniform resource locators ("URLs") 310 (e.g., "action" URLs of a main electronic page form) and page titles 312. It should be understood that the aforementioned elements are representative of "delta" controls whose changes may be calculated by the server 102 described above. In particular, the aforementioned elements may comprise content in an electronic page which is subject to change over time.

Figure 4:
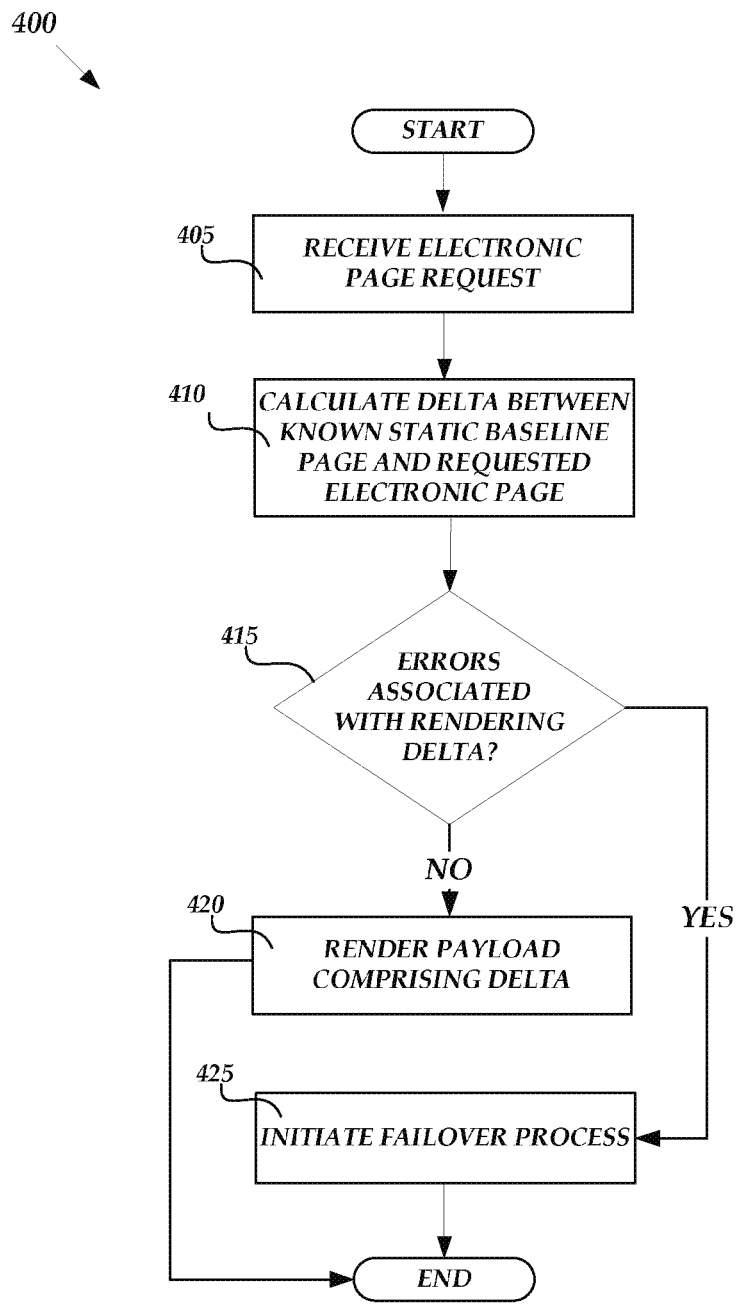
FIG. 4 is a flow diagram illustrating an exemplary server minimal download process, in accordance with an embodiment.

FIG. 4 is a flow diagram illustrating an exemplary server minimal download process 400, in accordance with an embodiment. At 405, the process 400 begins as part of receiving a request for an electronic (or web) page by a server. For example, a user can use a browser-type application to submit a URL request to a dedicated server for a particular electronic page.

At 410, the server calculates a delta between a known static baseline electronic page and the requested electronic page. As discussed above, the static baseline electronic page may comprise an electronic page without content that utilizes a master electronic page comprising shared content for electronic pages associated with a website.

At 415, the server determines whether one more errors are associated with rendering the calculated delta. In particular, the server may determine whether or not one or more of various error cases are present that might cause a minimal download strategy to fail. It should be understood that, as defined herein, "errors" are "situations" which make it impossible or unreasonable to render a calculated delta. A flow diagram illustrating various error cases will be described below with respect to FIG. 5.

If, at 415, the server determines that one or more errors are associated with rendering the calculated delta, then the process 400 branches to 425 where the server initiates a failover process which may include a failover to one or more options. In the case of failover, the server may also generate and send a small message to the client in lieu of sending the calculated delta for the requested electronic page, in accordance with an embodiment. Various failover options which may be selected by the server will be described below with respect to FIG. 5. From 425, the process 400 then ends.

If, at 415, the server determines that there is an absence of errors associated with rendering the calculated delta, then the process 400 continues to 420 where the server may render a payload comprising only the calculated delta. From 420, the process 400 then ends.

It will be appreciated that processing, networking, and/or other features can assist in providing the server minimal download process described above. Aspects of the process 400 can be distributed to and among other components of a computing architecture, and client, server, and other examples and embodiments are not intended to limit features described herein. While a certain number and order of operations is described for the exemplary flow of FIG. 4, it will be appreciated that other numbers and/or orders can be used according to desired implementations.

Figure 5:
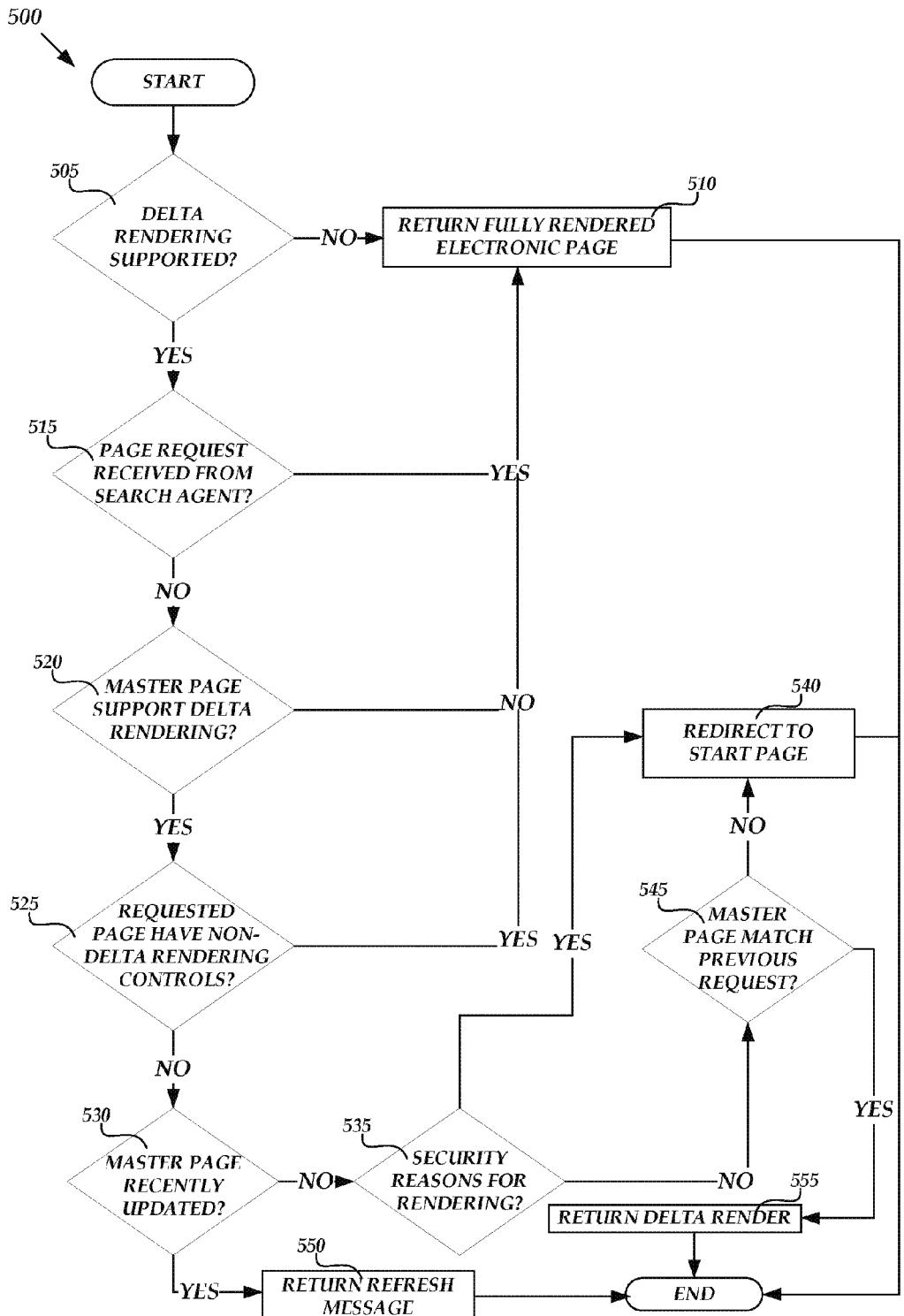
FIG. 5 is a flow diagram illustrating an exemplary error failover process, in accordance with an embodiment.

FIG. 5 is a flow diagram illustrating an exemplary error failover process 500, in accordance with an embodiment. At 505, the process 500 begins as part of determining, by a server, whether delta rendering is supported by a website for providing a requested electronic page. For example, the server may make a determination whether or not a website has been configured to support a minimal download strategy for rendering a payload comprising a calculated delta to a client.

If, at 505, the server determines that delta rendering is not supported, then the process 500 continues at 510 where the server returns a "classic" fully rendered electronic page (instead of a delta payload) to the client. From 510, the process 500 then ends.

If, at 505, the server determines that delta rendering is supported, then the process 500 branches to 515 where the server determines whether the request for the electronic page was received from a search agent. For example, the server may be configured to return fully rendered electronic pages (instead of a delta payload) from search requests received as a result of web crawling from web search engines so as to avoid the delta rendering of confusing or meaningless data which may be returned from the search.

If, at 515, the server determines that the request for the electronic page was received from a search engine, then the process 500 returns to 510 where the server returns a "classic" fully rendered electronic page (instead of a delta payload) to the client.

If, at 515, the server determines that the request for the electronic page was not received from a search engine, then the process 500 continues at 520 where the server determines whether a master electronic page supports delta rendering. As discussed above, a master electronic page (i.e., a master page) comprises shared content for a website associated with the requested electronic page.

If, at 520, the server determines that the master electronic page does not support delta rendering, then the process 500 returns to 510 where the server returns a "classic" fully rendered electronic page (instead of a delta payload) to the client.

If, at 520, the server determines that the master electronic page supports delta rendering, then the process 500 continues at 525 where the server determines whether the requested electronic page has any non-delta rendering controls.

If, at 525, the server determines that the requested electronic page contains non-delta rendering controls, then the process 500 returns to 510 where the server returns a "classic" fully rendered electronic page (instead of a delta payload) to the client.

If, at 525, the server determines that the requested electronic page does not contain non-delta rendering controls, then the process 500 continues at 530 where the server determines whether the master electronic page has been recently updated.

If, at 525, the server determines that the master electronic page has been recently updated, then the process 500 branches to 550 where the server returns a refresh message (i.e., a "refresh all" message) to the client. From 550, the process 500 then ends.

If, at 525, the server determines that the master electronic page has not been recently updated, then the process 500 continues at 535 where the server determines whether there are security reasons for rendering a full page download of the requested electronic page. For example, data security issues may arise due to different (i.e., non-matching) website collection activities associated with the requested electronic page. In response to the aforementioned data security issues, the server may failover to rendering a full page download instead of a delta payload to the client.

If, at 535, the server determines that there are security reasons for rendering a full page download of the requested electronic page, then the process 500 continues at 540 where the server redirects the electronic page request to a start page for an associated website. From 540, the process 500 then ends.

If, at 535, the server determines that there are not security reasons for rendering a full page download of the requested electronic page, then the process 500 branches to 545 where the server determines whether the master page for the requested electronic page matches a previous request for the electronic page.

If, at 545, the server determines that the master page for the requested electronic page does not match a previous request for the electronic page, then the process 500 returns to 540 where the server redirects the electronic page request to a start page for an associated website.

If, at 545, the server determines that the master page for the requested electronic page matches a previous request for the electronic page, then the process 500 branches to 555 where the server returns a delta render of the requested electronic page (i.e., the delta payload) to the client. From 555, the process 500 then ends.

It will be appreciated that processing, networking, and/or other features can assist in providing the error failover process described above. Aspects of the process 500 can be distributed to and among other components of a computing architecture, and client, server, and other examples and embodiments are not intended to limit features described herein. While a certain number and order of operations is described for the exemplary flow of FIG. 5, it will be appreciated that other numbers and/or orders can be used according to desired implementations.

While certain embodiments are described herein, other embodiments are available, and the described embodiments should not be used to limit the claims. Exemplary communication environments for the various embodiments can include the use of secure networks, unsecure networks, hybrid networks, and/or some other network or combination of networks. By way of example, and not limitation, the environment can include wired media such as a wired network or direct-wired connection, and/or wireless media such as acoustic, radio frequency (RF), infrared, and/or other wired and/or wireless media and components. In addition to computing systems, devices, etc., various embodiments can be implemented as a computer process (e.g., a method), an article of manufacture, such as a computer program product or computer readable media, computer readable storage medium, and/or as part of various communication architectures.

Suitable programming means include any means for directing a computer system or device to execute steps of a method, including for example, systems comprised of processing units and arithmetic-logic circuits coupled to computer memory, which systems have the capability of storing in computer memory, which computer memory includes electronic circuits configured to store data and program instructions. An exemplary computer program product is useable with any suitable data processing system. While a certain number and types of components are described, it will be appreciated that other numbers and/or types and/or configurations can be included according to various embodiments. Accordingly, component functionality can be further divided and/or combined with other component functionalities according to desired implementations.

The term computer readable media as used herein may include computer storage media. Computer storage media may include volatile and nonvolatile, removable and non-removable media implemented in any method or technology for storage of information, such as computer readable instructions, data structures, program modules, or other data. System memory, removable storage, and non-removable storage are all computer storage media examples (i.e., memory storage.). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by a computing device. Any such computer storage media may be part of device.

The embodiments and examples described herein are not intended to be limiting and other embodiments are available. Moreover, the components described above can be implemented as part of networked, distributed, and/or other computer-implemented environment. The components can communicate via a wired, wireless, and/or a combination of communication networks. Network components and/or couplings between components of can include any of a type, number, and/or combination of networks and the corresponding network components include, but are not limited to, wide area networks (WANs), local area networks (LANs), metropolitan area networks (MANs), proprietary networks, backend networks, etc.

Client computing devices/systems and servers can be any type and/or combination of processor-based devices or systems. Additionally, server functionality can include many components and include other servers. Components of the computing environments described in the singular tense may include multiple instances of such components. While certain embodiments include software implementations, they are not so limited and encompass hardware, or mixed hardware/software solutions. Other embodiments and configurations are available.

Exemplary Operating Environment

Figure 6:
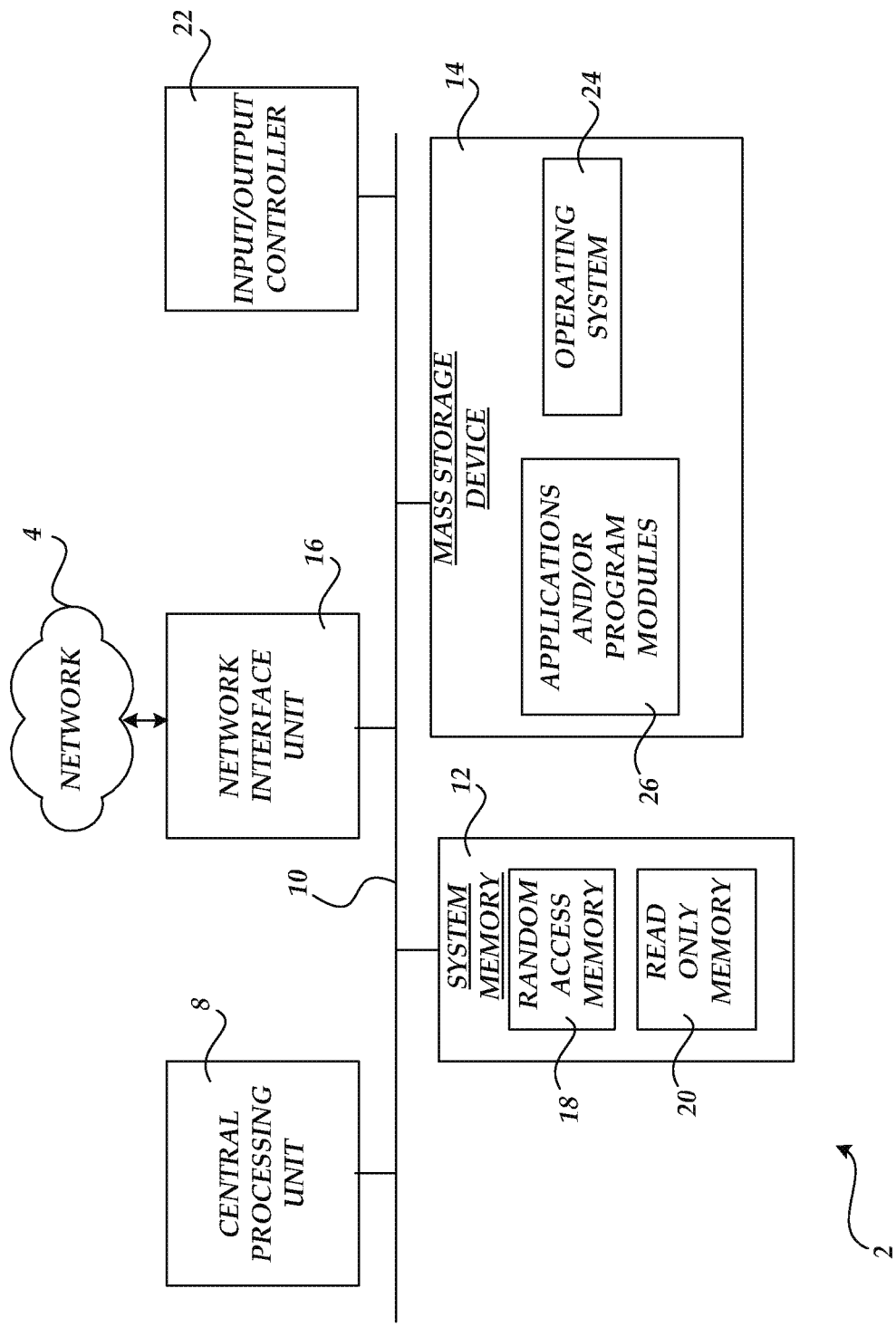
FIG. 6 is a block diagram illustrating an exemplary computing device for implementation of various embodiments described herein.

Referring now to FIG. 6, the following discussion is intended to provide a brief, general description of a suitable computing device in which embodiments of the invention may be implemented. While embodiments of the invention will be described in the general context of program modules that execute in conjunction with program modules that run on an operating system on a personal computer, those skilled in the art will recognize that the invention may also be implemented in combination with other types of computer systems, devices, and/or program modules.

Generally, program modules include routines, programs, components, data structures, and other types of structures that perform particular tasks or implement particular abstract data types. Moreover, those skilled in the art will appreciate that the embodiments of the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 6, an illustrative computing device for embodiments of the invention will be described. As shown in FIG. 6, computer 2 comprises a general purpose server, desktop, laptop, handheld, tablet or other type of computer capable of executing one or more application programs. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20. The computer 2 further includes a mass storage device 14 for storing an operating system 24, application programs, and other program modules (e.g., applications and/or other program modules 26).

The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 4, such as a local network, the Internet, etc. for example. The computer 2 may connect to the network 4 through a network interface unit 16 connected to the bus 10. It should be appreciated that the network interface unit 16 may also be utilized to connect to other types of networks and remote computing systems. The computer 2 may also include an input/output controller 22 for receiving and processing input from a number of other devices, including a keyboard, mouse, etc. (not shown). Similarly, an input/output controller 22 may provide output to a display screen, a printer, or other type of output device.

As mentioned briefly above, a number of program modules and data files may be stored in the mass storage device 14 and RAM 18 of the computer 2, including an operating system 24 suitable for controlling the operation of a networked personal computer, such as the WINDOWS operating systems from MICROSOFT CORPORATION of Redmond, Wash. The mass storage device 14 and RAM 18 may also store one or more program modules. In particular, the mass storage device 14 and the RAM 18 may store the applications and/or program modules 26 which may include, without limitation, a web application platform, word processing, spreadsheet, drawing, e-mail, and other applications and/or program modules, etc. It should be understood that the web application platform may allow for the management and provisioning of intranet portals, extranets, websites, document & file management, collaboration spaces, social tools, enterprise search, business intelligence, process integration, system integration, workflow automation, and core infrastructure for third-party solutions. In accordance with an embodiment, the applications and/or program modules 26 may comprise the SHAREPOINT web application platform from MICROSOFT CORPORATION of Redmond, Wash.

It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A server computer comprising:
   memory for storing executable program code; and
   a processor, functionally coupled to the memory, the processor being responsive to computer-executable instructions contained in the program code and operative to:
   receive an electronic page request;
   determine whether a master page for the requested electronic page matches a previous request for the electronic page;
   calculate, when the master page matches the previous request, a delta between a known static baseline electronic page and the requested electronic page, the static baseline electronic page comprising an electronic page without content that utilizes a master electronic page comprising shared content for electronic pages associated with a website, wherein calculating the delta comprises:
   arranging page controls of the electronic page in a hierarchy,
   accumulating a markup of the requested electronic page in a first output buffer,
   accumulating, using the accumulated markup, updateable content for each of the page controls through the iteration on the hierarchy in a second output buffer, wherein accumulating the updateable content comprises successively passing the updateable content to children controls in the hierarchy, and
   calculating the delta from the updateable content accumulated in the second output buffer
   provide a payload comprising the calculated delta.

2. The server computer of claim 1, wherein the processor is further operative to:
   discard the first output buffer; and
   utilize only the second output buffer to generate a payload, the payload comprising the updateable content.

3. The server computer of claim 2, wherein the updateable content comprises content sections and metadata for the requested electronic page.

4. The server computer of claim 3, wherein the content sections comprise one or more of the following; text, scripts, stylesheets, hidden files, uniform resource locators (URLs) and page titles.

5. The server computer of claim 4, wherein the processor is further operative to register, utilizing a plurality of managers, for one or more of the scripts and stylesheets.

6. The server computer of claim 5, wherein the one or more of the scripts and stylesheets are output from the plurality of mangers as a list of files during rendering of the payload.

7. The server computer of claim 1, wherein the processor is further operative to determine whether one more errors are associated with rendering the delta, wherein the processor is further operative to failover to one or more options upon determining that the one or more errors are associated with rendering the delta, and wherein the processor, in determining whether one more errors are associated with rendering the calculated delta, is operative to:
   determine whether delta rendering is supported by a website for providing the requested electronic page;
   determine whether the electronic page request is received from a search agent;
   determine whether delta rendering is supported by the master page; and
   determine whether the requested electronic page has non-delta rendering controls.

8. The server computer claim 7, wherein upon determining that the requested electronic page does not have non-delta rendering controls, the processor is further operative to determine whether the master page has been recently updated.

9. The server computer of claim 8, wherein upon determining that the master page has not been recently updated, the processor is further operative to:
   determine whether there are security reasons for rendering a full page download of the requested electronic page.

10. The server computer of claim 9, wherein the processor, in failing over to one or more options, is operative to redirect the request to a start page for the website based on at least one of: the security reasons for rendering a full page download of the requested electronic page and; when the requested electronic page fails to match the previous request.

11. The server computer of claim 8, wherein the processor, in failing over to one or more options, is operative to return a refresh message.

12. The server computer of claim 7, wherein the processor, in failing over to one or more options, is operative to return a fully rendered electronic page in response to the electronic page request upon determining that the delta rendering is not supported by the website for providing the requested electronic page, determining that the electronic page request is received from a search agent and determining that the requested electronic page has non-delta rendering controls.

13. A method comprising:
receiving, by a computing device, a web page request;
determining whether a master page for the requested electronic page matches a previous request for the electronic page;
calculating, when the master page matches the previous request by the computing device, a delta between a known static baseline web page and the requested web page, the static baseline web page comprising a web page without content that utilizes a master web page comprising shared content for web pages associated with a website, wherein calculating the delta comprises:
arranging page controls of the electronic page in a hierarchy,
accumulating a markup of the requested electronic page in a first output buffer,
accumulating, using the accumulated markup, updateable content for each of the page controls through iteration on the hierarchy in a second output buffer, wherein accumulating the updateable content comprises successively passing the updateable content to children controls in the hierarchy, and
calculating the delta from the updateable content accumulated in the second output buffer;
providing a payload comprising the calculated delta.

14. The method of claim 13, further comprising:
discarding the first output buffer;
utilizing only the second output buffer to generate the payload, the updateable content comprising content sections and metadata for the requested web page, the content sections comprising one or more of the following: text, scripts, stylesheets, hidden files, uniform resource locators (URLs) and page titles;
utilizing a plurality of managers, for one or more of the scripts and stylesheets; and
outputting the one or more of the scripts and stylesheets from the plurality of mangers as a list of files.

15. The method of claim 14, further comprising determining whether one more errors are associated with rendering the calculated delta; and
failing over to one or more options upon determining that the one or more errors are associated with rendering the calculated delta, wherein determining whether one more errors are associated with rendering the calculated delta comprises:
determining whether delta rendering is supported by a website for providing the requested web page;
determining whether the web page request is received from a search agent;
determining whether delta rendering is supported by the master page; and
determining whether the requested web page has non-delta rendering controls.

16. The method of claim 15, further comprising:
determining whether the master page has been recently updated; and
upon determining that the master page has not been recently updated, then:
determining whether there are security reasons for rendering a full page download of the requested web page.

17. The method of claim 16, wherein failing over, by the computing device, to one or more options comprises returning a fully rendered web page in response to the web page request upon at least one of: determining that the delta rendering is not supported by the website for providing the requested web page, determining that the web page request is received from a search agent and determining that the requested web page has non-delta rendering controls.

18. The method of claim 16, wherein failing over, by the computing device, to one or more options comprises returning a refresh message.

19. The method of claim 16, wherein failing over, by the computing device, to one or more options comprises redirecting the request to a start page for the website based on at least one of: the security reasons for rendering a full page download of the requested web page and when the requested web page fails to match the previous request.

20. A computer-readable storage device comprising computer-executable instructions which, when executed by a computing device, will cause the computing device to perform a method comprising:
receiving an electronic page request;
determining whether a master page for the requested electronic page matches a previous request for the electronic page;
calculating a delta between a known static baseline electronic page and the requested electronic page, the static baseline electronic page comprising an electronic page without content that utilizes a master electronic page comprising shared content for electronic pages associated with a website, wherein calculating the delta comprising
arranging page controls of the electronic page in a hierarchy,
accumulating a markup of the requested electronic page in a first output buffer,
accumulating, using the accumulated markup, updateable content for each of the page controls through iteration on the hierarchy in a second output buffer, wherein accumulating the updateable content comprises successively passing the updateable content to children controls in the hierarchy, and
calculating the delta from the updateable content accumulated in the second output buffer,
determining whether one more errors are associated with rendering the calculated delta; and
rendering a payload comprising only the calculated delta upon determining an absence of errors are associated with rendering the requested electronic page by:
discarding the first output buffer; and
utilizing only the second output buffer to generate the payload, the payload comprising a block of data including the updateable content, the updateable content comprising content sections and metadata for the requested electronic page.

* * * * *